(12) United States Patent
Chettouf et al.

(10) Patent No.: US 10,399,061 B2
(45) Date of Patent: Sep. 3, 2019

(54) CATALYST (71) Applicant: SHELL OIL COMPANY, Houston, TX (US)

(72) Inventors: Abderrahmane Chettouf, Amsterdam (NL); Johan Peter Den Breejen, Amsterdam (NL); Ronald Jan Dogterom, Amsterdam (NL); Matthieu Simon Henri Fleys, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/127,068

(22) PCT Filed: Mar. 19, 2015

(86) PCT No.: PCT/EP2015/055782
§ 371 (c)(1),
(2) Date: Sep. 19, 2016

(87) PCT Pub. No.: WO2015/140250
PCT Pub. Date: Sep. 24, 2015

(65) Prior Publication Data
US 2017/0106354 A1 Apr. 20, 2017

(30) Foreign Application Priority Data
Mar. 21, 2014 (EP) .................................... 14161192

(51) Int. Cl.
B01J 21/04 (2006.01)
B01J 21/06 (2006.01)
(Continued)

(52) U.S. Cl.
CPC ............... *B01J 23/75* (2013.01); *B01J 21/04* (2013.01); *B01J 21/063* (2013.01); *B01J 23/34* (2013.01);
(Continued)

(58) Field of Classification Search
None
See application file for complete search history.

(56) References Cited

U.S. PATENT DOCUMENTS

| 4,409,131 A | 10/1983 | Fetchin |
| 5,502,019 A | 3/1996 | Augustine et al. |

(Continued)

FOREIGN PATENT DOCUMENTS

| CA | 1166655 | 5/1984 |
| WO | 200176734 | 10/2001 |

(Continued)

*Primary Examiner* — Colin W. Slifka (57) ABSTRACT

The Fischer-Tropsch process can be used for the conversion of hydrocarbonaceous feed stocks into normally liquid and/or solid hydrocarbons. The feed stock (e.g. natural gas, associated gas and/or coal-bed methane, coal) is converted in a first step into a mixture of hydrogen and carbon monoxide (this mixture is often referred to as synthesis gas or syngas). The synthesis gas (or syngas) is then converted in one or more steps over a suitable catalyst at elevated temperature and pressure into paraffinic compounds ranging from methane to high molecular weight molecules comprising up to 200 carbon atoms, or, under particular circumstances, even more. The present invention relates to a catalyst, a method for manufacturing said catalyst. The present invention further relates to a catalyst obtainable by said method. The present invention further relates to a multi tubular reactor comprising said catalyst.

14 Claims, 4 Drawing Sheets (51) Int. Cl.

| | | |
|---|---|---|
| *B01J 23/75* | (2006.01) | |
| *B01J 35/10* | (2006.01) | |
| *B01J 37/02* | (2006.01) | |
| *C10G 2/00* | (2006.01) | |
| *B01J 23/34* | (2006.01) | |
| *B01J 35/02* | (2006.01) | |
| *B01J 35/04* | (2006.01) | |
| *B33Y 80/00* | (2015.01) | |
| *B22F 3/105* | (2006.01) | |
| *B22F 3/24* | (2006.01) | |
| *B22F 5/10* | (2006.01) | |
| *F01N 3/28* | (2006.01) | |
| *B29C 64/124* | (2017.01) | |
| *B29C 64/153* | (2017.01) | |

(52) U.S. Cl.
CPC ............ *B01J 35/026* (2013.01); *B01J 35/04* (2013.01); *B01J 35/1028* (2013.01); *B01J 37/0244* (2013.01); *B22F 3/1055* (2013.01); *B22F 3/24* (2013.01); *B22F 5/10* (2013.01); *B29C 64/124* (2017.08); *B29C 64/153* (2017.08); *B33Y 80/00* (2014.12); *C10G 2/32* (2013.01); *C10G 2/332* (2013.01); *C10G 2/333* (2013.01); *C10G 2/341* (2013.01); *F01N 3/281* (2013.01); *Y02P 10/295* (2015.11)

(56) References Cited

U.S. PATENT DOCUMENTS

| | | |
|---|---|---|
| 5,783,604 A | 7/1998 | Garvia Nunez |
| 5,783,607 A | 7/1998 | Chaumette et al. |
| 5,863,856 A | 1/1999 | Mauldin |
| 2002/0198429 A1 | 12/2002 | Ramani et al. |
| 2003/0149120 A1* | 8/2003 | Wang ............... B01J 8/0285 518/715 |
| 2004/0076562 A1 | 4/2004 | Manzanec et al. |
| 2012/0258855 A1* | 10/2012 | Dekker ............... B01J 23/85 502/240 |

FOREIGN PATENT DOCUMENTS

| | | |
|---|---|---|
| WO | 2006079848 | 8/2006 |
| WO | 2010063850 | 6/2010 |
| WO | 2010069925 | 6/2010 |
| WO | 2010069927 | 6/2010 |
| WO | 2012032325 | 3/2012 |
| WO | 2012084788 | 6/2012 |
| WO | 2013008029 | 1/2013 |

* cited by examiner

CATALYST

PRIORITY CLAIM

The present application is the National Stage (§ 371) of International Application No. PCT/EP2015/055782, filed Mar. 19, 2015, which claims priority from European Patent Application No. 14161192.1, filed Mar. 21, 2014, incorporated herein by reference.

FIELD OF THE INVENTION

The present invention relates to a method for manufacturing a catalyst. The present invention further relates to a catalyst obtainable by said method. The present invention further relates to a multi tubular reactor comprising said catalyst.

BACKGROUND TO THE INVENTION

The Fischer-Tropsch process can be used for the conversion of hydrocarbonaceous feed stocks into normally liquid and/or solid hydrocarbons (0° C., 1 bar). The feed stock (e.g. natural gas, associated gas and/or coal-bed methane, coal) is converted in a first step into a mixture of hydrogen and carbon monoxide (this mixture is often referred to as synthesis gas or syngas). The synthesis gas (or syngas) is then converted in one or more steps over a suitable catalyst at elevated temperature and pressure into paraffinic compounds ranging from methane to high molecular weight molecules comprising up to 200 carbon atoms, or, under particular circumstances, even more.

The Fischer-Tropsch reaction is very exothermic and temperature sensitive. In consequence, careful temperature control is required to maintain optimum operation conditions and desired hydrocarbon product selectivity. Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebullated bed reactors.

Further, general methods of preparing catalyst and catalyst materials and forming catalyst mixtures are known in the art, see for example U.S. Pat. Nos. 4,409,131, 5,783,607, 5,502,019, WO 0176734, CA 1166655, U.S. Pat. Nos. 5,863,856 and 5,783,604. These include preparation by co-precipitation and impregnation.

The Fischer-Tropsch reaction is very exothermic and temperature sensitive. In consequence, careful temperature control is required to maintain optimum operation conditions and desired hydrocarbon product selectivity. The fact that the reaction is very exothermic also has the consequence that when temperature control is not adequate, the reactor temperature can increase very quickly, which carries the risk of a reactor runaway. A reactor runaway may result in highly increased temperatures at one or more locations in the reactor. A high-speed stop may, for example, be required when the temperature in the Fischer-Tropsch reactor increases to an unacceptable value either locally or over the entire reactor, when there is an interruption in the gas flow, or in the case of other unforeseen circumstances. When there is a threat of a runaway, it is often wise to stop the reaction as quick as possible. A reactor runaway is a most undesirable phenomenon, as it may result in catalyst deactivation which necessitates untimely replacement of the catalyst, causing reactor downtime and additional catalyst cost. Many of the catalysts of fixed bed catalysts are aimed at surviving measurement against an occurring reactor runaway or circumstances leading to a possible runaway.

Multi-tubular reactors also suffer from pressure drop. This pressure drop is caused by a loss of pressure in a reactor or reactor tube due to the resistance a fluid encounters when flowing through the reactor or reactor tube. In case of multi-tubular reactors, pressure drop can even result in varying pressures between the different tubes.

The desired use of highly active and less diffusion limited catalysts in Fischer-Tropsch fixed-bed reactors makes the situation even more challenging. The susceptibility to a runaway increases with increased catalyst activity and with reduced diffusion limitation of the catalyst. Examples of methods that are especially suitable for Fischer-Tropsch fixed-bed reactors comprising highly active and less diffusion limited catalysts can be found in WO2010063850, WO2010069925, and WO2010069927.

SUMMARY OF THE INVENTION

It is an object of the present invention to provide for an improved catalyst. It is further an object to provide for a method to obtain such a catalyst.

One or more of the objects is met by a catalyst according to the present invention. The catalyst for carrying out a Fischer-Tropsch reaction comprises a matrix material and a catalytic material wherein the catalyst comprises stepped-shape channels through which synthesis gas comprising hydrogen and carbon monoxide can flow. The geometry of the channels result in good heat transport properties. The stepped shape also promotes random and turbulent flow which is desired in a Fischer-Tropsch reactor to ensure good mixing of the reactants. The open structure of the catalyst according to the present invention also reduces pressure drop during operation in a Fischer-Tropsch reactor.

DETAILED DESCRIPTION OF THE INVENTION

The present invention relates to a catalyst for carrying out a Fischer-Tropsch reaction comprising a matrix material (1) and a catalytic material (2) wherein the catalyst comprises stepped-shape channels through which synthesis gas comprising hydrogen and carbon monoxide can flow.

The catalyst according to the present invention can be obtained by a method according to the present invention. The method for manufacturing a catalyst wherein, the catalyst has channels for a reaction fluid to flow through and said channels having walls, said walls comprising a catalytic material, said method comprising the steps of:

(i) forming a layer of a matrix material by providing a powder or a paste;
(ii) binding or fusing a powder or a paste in said layer according to a predetermined pattern; and
(iii) repeating (i) and (ii) layer upon layer to form a structure wherein each subsequent layer is bound or fused to a preceding layer forming a structure comprising stepped-shape channels through which synthesis gas comprising hydrogen and carbon monoxide can flow, wherein the catalytically active material is provided in step (i) as a powder or a paste, or wherein the catalytically active material is provided after obtaining the structure in step (iii) by applying a slurry comprising the catalytically active material to the structure obtaining a catalyst. Said slurry can be applied to the structure by applying a vacuum causing the slurry to be drawn through the structure. This results in the coating of the channel walls with catalytically active material. In case the structure is coated by applying a slurry it is preferred that the catalyst is dried after application preferably ranging 50-200 degrees Celsius, preferably from 75-150 degrees Celsius. Optionally the catalyst can be calcined at a temperature in the range of 300-600 degrees Celsius, preferably 350-550. The inventors found that a catalyst which is obtainable by this method has several improved properties. For example, the transport of the heat of the reaction to the cooled wall by the indigenously formed heavy paraffin synthesis products is more efficient than that of the prior art catalysts. With catalyst is meant for the present invention a 3 dimensionally shaped material composed of at least a matrix material and the catalytic material. Said catalyst can be utilized in different shapes and sizes. For example, a single catalyst can be used to fill a reactor tube. Alternatively, catalysts according to the present invention can be used to form stacked beds in reactor tubes. For the present invention channels allow for a fluid such as a gas or liquid to flow through the catalyst. For the present invention the term catalyst includes catalyst precursor.

The channels of the catalyst according to the present invention are stepped-shaped. With stepped shape is meant that a stairs shaped structure. The direction of the stairs is such that a fluid flowing through the channels move up/down the stairs. Hence, the stepped-shape of the channels is in the direction of which the channels extend through the catalyst.

Further the channels are positioned such that fluids can flow from one channel to an adjacent channel. This is achieved by positioning adjacent channels such that the adjacent channels cross. At these crossings openings exist through which a liquid/gas flowing through one channel can move to an adjacent second channel.

Both the stepped-shape of the channels and the crossing of a fluid from one channel to an adjacent channel results in good mixing of the fluid constituents (like carbon monoxide and hydrogen in syngas). Further the turbulence caused by the stepped shape and the crossing of fluid from one channel to an adjacent one results in improved contact of the fluid with the catalytically active material present on the walls of the channels.

A further advantage of the present invention relates to exothermic reactions. In these reactions heat is generated which has to be exported out-of the catalyst structure. The direction of the channels in the catalyst allow for an efficient transport of heat by the fluid from the inside of the catalyst.

In case a single catalyst fills a reactor tube or a catalyst being a catalyst structure snugly fitting in a reactor tube, the channels in the catalyst are orientated such that reaction fluid and hydrocarbon product can flow to the reactor tube wall. In the reactor the reactor tubes are located within a jacket containing water. The heat of reaction raises the temperature of the catalyst bed within each tube. This thermal energy is transferred to the tube wall heating the water in the jacket. The heated water in turn is cooled/condensed in another heat exchanger outside of the reactor. By allowing the reaction medium and product to flow to and from the reactor wall during operation heat is transferred via the reactor wall to the water heating the water and cooling the reaction medium and product. Reaction medium and product at the reactor wall can also flow from the reactor tube wall towards the center of the catalyst. This allows for the reaction medium and product to cool the catalyst.

The improved transport of heat is very beneficial in Fischer-Tropsch reactions. The Fischer-Tropsch reaction is very exothermic and temperature sensitive. In consequence, careful temperature control is required to maintain optimum operation conditions and desired hydrocarbon product selectivity. The fact that the reaction is very exothermic also has the consequence that when temperature control is not adequate, the reactor temperature can increase very quickly, which carries the risk of a reactor runaway.

A reactor runaway may result in highly increased temperatures at one or more locations in the reactor. A high-speed stop may, for example, be required when the temperature in the Fischer-Tropsch reactor increases to an unacceptable value either locally or over the entire reactor, when there is an interruption in the gas flow, or in the case of other unforeseen circumstances. When there is a threat of a runaway, it is often wise to stop the reaction as quick as possible. A reactor runaway is a most undesirable phenomenon, as it may result in catalyst deactivation which necessitates untimely replacement of the catalyst, causing reactor downtime and additional catalyst cost.

Advantageously the improved heat transport decreases the chance of a reactor runaway, hence minimizing the chance that a reactor has to be taken offline. It also allows for the temperature to be controlled better.

A further advantage of the present invention is that the improved heat transport allows for application of increased (compared to prior art catalysts) reactor tube diameters in gas-to-liquid processes. The reaction converting synthesis gas into heavy paraffin is an exothermic one. This reaction generates a lot of heat which has to be transported away from the reaction zone in order to prevent a run-away of the reaction. By increasing the diameter of the tube it becomes more difficult to cool the center of the tube hence increasing the chance that the center cannot be cooled sufficiently in order to keep the temperature under control and prevent a reactor runaway. With a catalyst according to the present invention reactor tubes having a larger diameter can be used due to the improved transport of heat.

The catalyst further comprises a matrix material. This material provides support to the structure of the catalyst. The catalytic material and matrix material are provided in step (i) in the form of a powder or paste.

Catalytic material comprises a catalytically active material and a carrier material. Preferably the carrier material has porous morphology. The catalytically active material is present on the surface of the carrier material.

In an embodiment of the present invention, each layer obtained in step (i) comprises openings which openings of the layers obtained in step (i) together form one or more channels in the catalyst obtained in step (iii). These channels allow for the reaction medium to flow through the catalyst. The openings in the layers can be in the form of holes such that the layer is of one piece. Another option is that the openings cross through the layer completely. In this case one layer consists of two or more unconnected parts.

In an embodiment of the present invention, in step (i) the catalyst material is provided such that it borders the openings and preferably is provided such that the catalyst material is present only between the openings and the matrix material. Since the catalyst is built layer by layer it is possible to apply catalytic material locally whilst controlling the thickness of the catalytic material in the catalyst. Preferably the catalytic material is provided during the method of the present invention such that it is present at the walls of the channels of the catalyst obtained in the final step. This method allows for layers of catalytic material to have a constant layer thickness throughout the catalyst structure.

In Fischer-Tropsch reactions it is advantageous for the reaction to have a high selectivity for a certain chain length of the hydrocarbon product. One way of improving the selectivity of the reaction is to reduce the layer thickness of the catalytic material. Advantageously the method of the present invention allows for the controlled application of small amounts of catalytic material, resulting in the catalyst in a thin layer of catalytic material on the walls of the channels. Preferably the catalytic material is applied such that is present as a layer on the channel wall and preferably has a layer thickness of from about 1 to 300 microns, more preferably about 5 to about 200 microns. Most preferred the layer thickness of the catalytic material ranges from 10-100 microns. With this layer thickness highly intrinsic catalytically active materials can be used without running the risk of significant diffusion limitation.

In an embodiment of the present invention, steps (i) and (ii) are repeated such that the channels of the catalyst have a stepped shape. Preferably the stepped channels in a catalyst are connected with each other such that a fluid can flow through a channel but also flow from one channel to another (adjacent) channel. The stepped channels are preferably arranged such that a channel and an adjacent channel cross. In an embodiment of the present invention several channels, through which a fluid can flow, said channels having a stepped shape, are in connection with each other such that a fluid can flow from one channel to another channel. When the catalyst according to the present invention is applied in Fischer-Tropsch reactions the shape of the catalyst directs the reactants to all positions within the structures of the catalyst. This maximizes usage of the catalyst and hence improves the conversion of hydrogen and carbon monoxide to hydrocarbons.

In an embodiment of the present invention the catalyst support material is selected from the group consisting of refractory oxides, or mixtures thereof, more preferably alumina, silica, titania, zirconia or combinations thereof.

In an embodiment the catalyst material comprises a catalytically active component which is selected from the group consisting of cobalt, iron, ruthenium and mixtures thereof, preferably cobalt.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements. Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

A most suitable catalyst comprises cobalt as the catalytically active metal and zirconium as a promoter. Another most suitable catalyst comprises cobalt as the catalytically active metal and manganese and/or vanadium as a promoter. If the catalyst comprises cobalt as the catalytically active metal and manganese and/or vanadium as promoter, the cobalt: (manganese+vanadium) atomic ratio is advantageously at least 12:1.

In an embodiment of the present invention the method of manufacturing a catalyst is further divided into at least three stages. In stage I the steps (i) and (ii) as described previously are repeated several times to obtain a first layer having openings with a stepped shape in a first direction. In stage II steps (i) and (ii) are repeated several times to obtain a second layer (on the first layer) having openings with a stepped shape in a second direction. In stage III, stage I and stage II are repeated at least once to form a catalyst. Preferably said first and second directions intersect. Preferably the first and second directions are substantially perpendicular to each other.

In an embodiment of the present invention a catalyst for carrying out a Fischer-Tropsch reaction comprises a matrix material and a catalytic material wherein the catalyst comprises step shaped channels through which synthesis gas comprising hydrogen and carbon monoxide can flow. The geometry of the channels result in good heat transport properties. The stepped shape also promotes random and turbulent flow which is desired in a Fischer-Tropsch reactor to ensure good mixing of the reactants. The open structure of the catalyst according to the present invention also reduces pressure drop during operation in a Fischer-Tropsch reactor. The matrix material is preferably chosen from the group consisting of steel, preferably stainless steel, titanium, aluminum, refractory oxides such as alumina, titania, silica and mixtures thereof.

The catalyst according to the present invention is obtainable by a method according to the present invention. Due to the improved properties of the catalyst it can be advantageously used in carrying out a Fischer-Tropsch reaction as described previously.

In an embodiment of the present invention the catalyst has an open volume of more than 60%, preferably more than 70%, more preferably more than 80%. This high voidage also comes with the advantage of a significantly reduced pressure drop as compared to for example a multitubular reactor with a bed of catalyst extrudates or pellets.

In an embodiment of the present invention the catalyst has a specific surface area from 1000-5000 m2/m3 of catalyst. Such a specific surface area provides for good conversion of the reactants in the catalyst while maintaining good heat transfer properties.

In an embodiment of the present invention the catalytic material is present as a layer on the channel wall and preferably has a layer thickness of from about 1 to 300 microns, more preferably about 5 to about 200 microns. By using a method according to the present invention excellent control of layer thickness is achieved.

In an embodiment of the present invention the catalyst comprises several channels through which a fluid can flow, said channels having a stepped-shape, preferably said channels are in connection with each other such that a fluid can flow from one channel to another channel.

The invention relates further to a reactor tube comprising a catalyst according to the present invention wherein one or more of the catalyst snugly fit the reactor tube or wherein said tube comprises several catalysts according to the present invention forming a stacked bed.

In the reactor tube the catalyst may be present in one or more pieces which together form a structure snugly fitting the reactor tube. For example it is possible to stack several catalysts according to the present invention on top of each other and/or next to each other in the reactor tube simplifying the loading of the tube. Since the catalyst snugly fits the reactor tube, the catalyst will remain in place during operation. With snugly fitting is meant that the size of the catalyst is such, compared to the size of the reactor tube, that during operation fluid does hardly by-pass the catalyst through a possible opening existing between the reactor tube wall and the catalyst. In case the opening between the catalyst and the reactor wall is too large, the fluid flowing through the reactor tube prefers to by-pass the catalyst since it encounters less resistance in-between the catalyst and reactor wall than when flowing through the catalyst. Hence in order to maximize catalyst usage the opening should be such that by-passing is minimized.

The present invention further relates to a method of manufacturing hydrocarbons, preferably with a Fischer-Tropsch reaction, comprising the step of providing a reaction fluid, preferably a gas comprising hydrogen and carbon monoxide (often referred to as syngas), to a catalyst according to the present invention. Preferably said reaction fluid is provided to the reactor tube according to the present invention. The advantage of using a catalyst according to the present invention in a Fischer-Tropsch reaction is that cooling of the reaction zone is more efficient.

Figure 1:
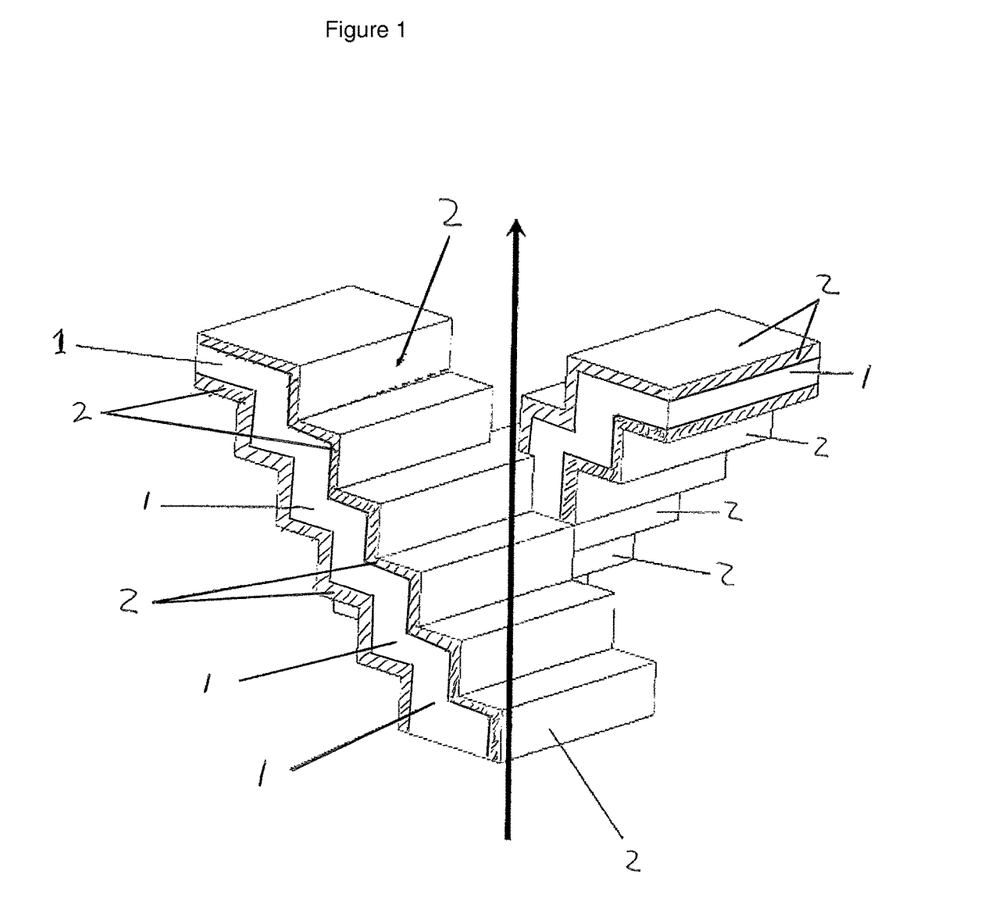
FIG. 1 depicts two channel walls in a catalyst according to the present invention.
Figure 2:
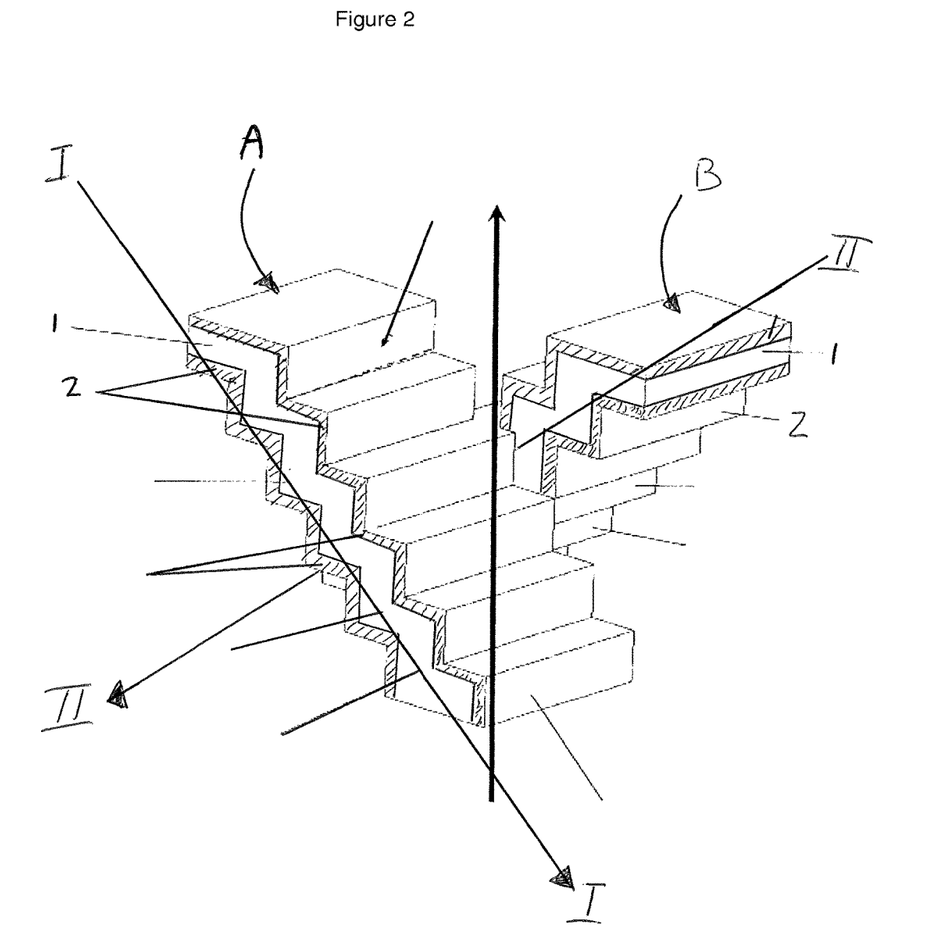
FIG. 2 depicts two channel walls according to the present invention.

Products of the Fischer-Tropsch synthesis may range from methane to heavy hydrocarbons. Preferably, the production of methane is minimized and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight. The CO conversion of the overall process is preferably at least 50%. The products obtained via the process according to the invention can be processed through hydrocarbon conversion and separation processes known in the art to obtain specific hydrocarbon fractions. Suitable processes are for instance hydrocracking, hydroisomerisation, hydrogenation and catalytic dewaxing. Specific hydrocarbon fractions are for instance LPG, naphtha, detergent feedstock, solvents, drilling fluids, kerosene, gasoil, base oil and waxes. The appended claims also form part of this description. The figures depict embodiments of the present invention. FIGS. 1 and 2 show a catalyst according to the present invention. The catalyst comprises a matrix material (1) and a catalytic material (2). As shown in FIG. 1 the catalytic material is present at the channel wall and can be considered the channel wall. Since reaction fluid flows on both sides of wall A and B, the catalytic material is present at both sides.

Figure 3:
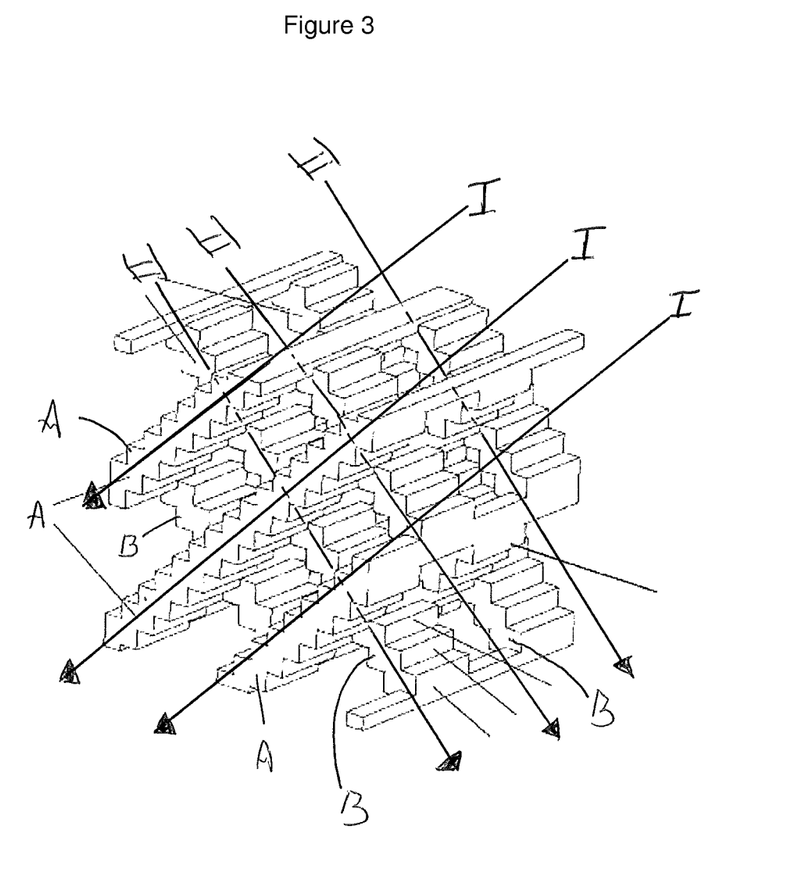
FIG. 3 shows an assembly of several channel walls as shown in FIGS. 1 and 2 together forming several channels.

FIGS. 1 and 2 depict two adjacent channel walls A and B. The stepped shape of the channel walls is clearly visible. It further shows a first channel wall A and a second adjacent channel wall B intercept. Additionally FIG. 2 shows how 2 adjacent walls can be orientated with respect to each other. FIG. 3 shows a more elaborate structure repeating the walls as depicted in FIGS. 1 and 2. As can be seen in FIG. 3 there are several channel walls A and B running in directions I and II respectively. Two opposing walls A define a channel running in direction I and two opposing walls B define a channel running in direction II. This arrangement also allows fluid to flow from a channel formed by two layers A to flow to a channel defined by two adjacent layers B.

Figure 4:
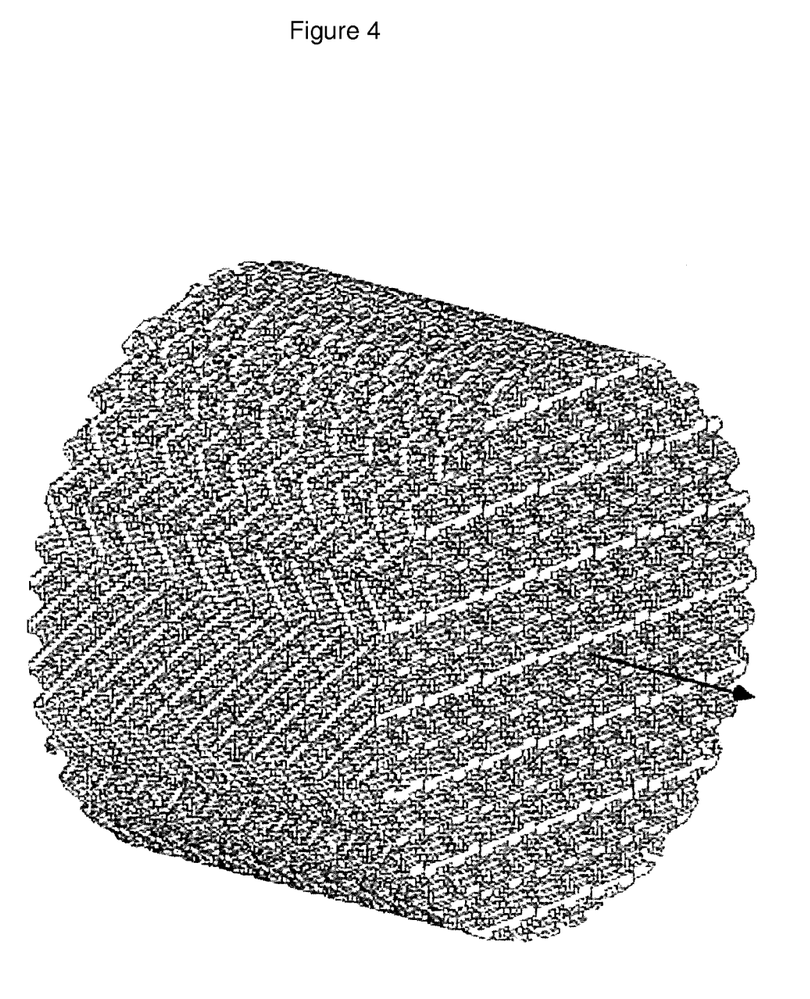
FIG. 4 shows a catalyst according to the present invention.

FIG. 4 shows a catalyst according to the present invention with a more elaborate structure. The structure can be manufactured such that it has a substantially circular shape and fits a reactor tube.

The invention will be further illustrated by the following non-limiting examples.

EXAMPLES

Example 1 Catalyst Preparation

Stepped-shape substrates were obtained by means of 3D printing. The 3D printer used is CONCEPTLaser M2 3D-printer. The printer can be programmed to print a substrate as depicted in one of the figures.

In general a computer can be programmed to operate a printer such that it will manufacture a substrate by performing the steps of:
i) forming a layer of a matrix material from a powder or paste;
ii) binding or fusing the powder or paste in said layer according to a predetermined pattern; and
iii) repeating (i) and (ii) layer upon layer to form a catalyst wherein each subsequent layer is bound or fused to a preceding layer. By repeating these steps several times a structure (the substrate) can be obtained having stepped-shape channels which correspond to the channels of a catalyst according to the present invention.

For this example two substrates were manufactured according to this method. One substrate structure was manufactured from titania and one from alumina.

The substrates prepared in example 1 above were contacted with an aqueous slurry in a vacuum coating process.

The slurry was composed of:
1968 grams of a mix of
1446 grams of titania, 750 grams of a cobalt hydroxide and a promoter, 850 grams of water;
350 grams of binder (an ammonium salt of lactic acid titanate chelate, Tyzor® obtained from DuPont);
3.2 grams of Triton X-45;
2250 grams of water.

The coated substrates were dried and calcined.

Example 2 Hydrocarbon Synthesis

The catalysts obtained in example 1 were reduced and subjected to a Fischer-Tropsch synthesis. The conditions at which the Fischer-Tropsch reaction was conducted are mentioned in table 1. The comparative examples are based on extrudates and are well known in the art. These can be obtained as explained in WO97/00231 and can be extruded in accordance with WO2012/084788.

TABLE 1

|  | Comp. | Sample 1 | Comp. | Sample 2 |
| --- | --- | --- | --- | --- |
| Catalyst shape/support | Extrudate | Stepped (alumina) | Extrudate | Stepped (titania) |
| Temperature (K) | 488 | 488 | 488 | 488 |
| $H_2/CO$ ratio | 1.9 | 1.9 | 1.9 | 1.9 |
| Syngas pressure | 19 | 19 | 18 | 18 |

TABLE 1-continued

| | Comp. | Sample 1 | Comp. | Sample 2 |
|---|---|---|---|---|
| CO conversion | 78 | 78 | 70 | 70 |
| WTY | 160 | 687 | 156 | 324 |
| $C_5^+$ selectivity (wt %) | 60 | 85 | 59 | 89 |
| $CO_2$ selectivity (%) | 2.2 | 0.8 | 2.3 | 5.1 |

From the results of Example 2 it is clear that the C5+ selectivity is much higher for the two catalysts according to the present invention.

Example 3 Catalyst Preparation

A catalyst according to the present invention can be obtained by using a screen printer XH STS from ASYS EKRA. The printer can be programmed to print a catalyst as depicted in one of the figures.

In general the printer will manufacture a catalyst wherein, the catalyst has channels for a reaction fluid to flow through and said channels having walls, said walls comprising a catalytic material, by executing a method comprising the steps of:
i) forming a layer of a catalytic material and a matrix material;
ii) binding or fusing the powder or paste in said layer according to a predetermined pattern; and
iii) repeating (i) and (ii) layer upon layer to form a catalyst wherein each subsequent layer is bound or fused to a preceding layer.

That which is claimed is:

1. A catalyst for carrying out a Fischer-Tropsch reaction comprising a matrix material (1) and a catalytic material (2) wherein the catalyst comprises stepped-shape channels through which synthesis gas comprising hydrogen and carbon monoxide can flow, the stepped-shape channels defined by opposing stepped-shape walls, such that a fluid flowing through the catalyst moves up/down a stairs and said channels are in connection with each other such that a fluid can flow from one channel to an adjacent channel and adjacent channels are oriented crosswise.

2. A catalyst according to claim 1 wherein the catalyst has an open volume of more than 60%, with respect to the reactor volume.

3. A catalyst according to claim 1 wherein the catalyst has a specific surface area from 1000-5000 m2/m3.

4. A catalyst according to claim 1 wherein the catalytic material is present as a layer on the stepped-shape walls and has a layer thickness of from about 1 to 300 microns.

5. A catalyst according to claim 1 wherein the catalytic material comprises a catalyst support material wherein the catalyst support material is selected from the group consisting of refractory oxides, metals, or mixtures thereof.

6. A catalyst according to claim 1 wherein the catalyst material comprises a catalytically active component which is selected from the group consisting of cobalt, iron, ruthenium and mixtures thereof.

7. A catalyst according to claim 1 wherein the catalyst material comprises a promoter, selected from the group consisting of zirconium, manganese, vanadium, rhenium, platinum, palladium and mixtures thereof.

8. A method for manufacturing a catalyst according to claim 1, wherein the stepped-shape walls comprise a catalytic material, said method comprising the steps of:
 (i) forming a layer of a matrix material by providing a powder or a paste;
 (ii) binding or fusing a powder or a paste in said layer according to a predetermined pattern; and
 (iii) repeating (i) and (ii) layer upon layer to form a structure wherein each subsequent layer is bound or fused to a preceding layer forming a structure comprising stepped shape channels through which synthesis gas comprising hydrogen and carbon monoxide can flow,
 wherein the catalytically active material is provided in step (i) as a powder or a paste, or wherein the catalytically active material is provided after obtaining the structure in step (iii) by applying a slurry comprising the catalytically active material to the structure obtaining a catalyst.

9. A method according to claim 8 wherein, each layer obtained in step (i) comprises openings which openings of the layers obtained in step (i) together form one or more channels in the catalyst obtained in step (iii).

10. A method according to claim 8 wherein, in step (i) the catalyst material (2) is provided such that it borders the openings and is provided such that the catalyst material (2) is present only between the openings and the matrix material (1).

11. A method according to claim 8 wherein, in step (iii), steps (i) and (ii) are repeated such that the channels of the catalyst have a stepped shape.

12. A method according to claim 8, wherein the method can be divided into at least three stages wherein:
 in stage I the steps (i) and (ii) are repeated several times to obtain a first layer (A) having openings with a stepped-shape in a first direction (I);
 in stage II steps (i) and (ii) are repeated several times to obtain a second layer (B) (on the first layer) having openings with a stepped shape in a second direction (II);
 in stage III, stage I and stage II are repeated at least once to form a structure;
 wherein said first and second direction intersect, are substantially perpendicular to each other.

13. A reactor tube comprising a catalyst according to claim 1 wherein one or more of the catalyst snugly fit the reactor tube or said reactor tube comprises several catalysts forming a stacked bed.

14. A method of manufacturing hydrocarbons comprising the step of providing a reaction fluid to a catalyst according to claim 1.

* * * * *